(12) United States Patent
Zhu

(10) Patent No.: US 11,382,125 B2
(45) Date of Patent: Jul. 5, 2022

(54) DATA TRANSMISSION METHOD, DEVICE AND COMPUTER READABLE STORAGE MEDIUM

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 97 days.

(21) Appl. No.: 16/637,225

(22) PCT Filed: Aug. 7, 2017

(86) PCT No.: PCT/CN2017/096266
§ 371 (c)(1),
(2) Date: Feb. 6, 2020

(87) PCT Pub. No.: WO2019/028606
PCT Pub. Date: Feb. 14, 2019

(65) Prior Publication Data
US 2020/0205185 A1 Jun. 25, 2020

(51) Int. Cl.
*H04W 72/12* (2009.01)
*H04W 76/27* (2018.01)
(Continued)

(52) U.S. Cl.
CPC ....... *H04W 72/1289* (2013.01); *H04L 5/0053* (2013.01); *H04L 5/0094* (2013.01);
(Continued)

(58) Field of Classification Search
None
See application file for complete search history.

(56) References Cited

U.S. PATENT DOCUMENTS

2015/0237649 A1* 8/2015 Zhang ............... H04W 72/0446
370/329
2017/0070374 A1* 3/2017 Nakamura ............. H04L 27/34
(Continued)

FOREIGN PATENT DOCUMENTS

CN 101605356 A 12/2009
CN 101742626 A 6/2016
(Continued)

OTHER PUBLICATIONS

Extended European Search Report of counterpart EP Application No. 17921040.6 dated Jan. 27, 2021.
(Continued)

*Primary Examiner* — Diane L Lo
(74) *Attorney, Agent, or Firm* — Finnegan, Henderson, Farabow, Garrett & Dunner, L.L.P.

(57) ABSTRACT

A data transmission method includes: receiving scheduling signaling sent by a base station, wherein the scheduling signaling carries scheduling type indication information; determining a scheduling type corresponding to the scheduling type indication information based on the scheduling type indication information and pre-stored configuration information, wherein the configuration information includes a correspondence between a plurality of pieces of scheduling type indication information and a plurality of scheduling types; and performing resource scheduling based on the scheduling type to achieve data transmission.

15 Claims, 6 Drawing Sheets

Receive scheduling signaling sent by a base station, wherein the scheduling signaling carries scheduling type indication information ⟶ 101

Determine, according to the scheduling type indication information and pre-stored configuration information, a scheduling type corresponding to the scheduling type indication information, the configuration information comprising a correspondence between a plurality of pieces of scheduling type indication information and a plurality of scheduling types ⟶ 102

Perform resource scheduling on the basis of the scheduling type to implement data transmission ⟶ 103

(51) Int. Cl.
  *H04L 5/00*      (2006.01)
  *H04W 72/04*     (2009.01)
  *H04L 101/622*   (2022.01)

(52) U.S. Cl.
  CPC ......... *H04L 61/6022* (2013.01); *H04W 72/04* (2013.01); *H04W 76/27* (2018.02)

(56) References Cited

U.S. PATENT DOCUMENTS

2017/0215188 A1    7/2017  Kim et al.
2019/0182833 A1*   6/2019  Li ..................... H04W 72/1289
2020/0214027 A1*   7/2020  Tang .................. H04W 72/042

FOREIGN PATENT DOCUMENTS

CN    106231677 A    12/2016
CN    106937400 A     7/2017

OTHER PUBLICATIONS

Examination Report of counterpart Indian Application No. 202027009324 dated Mar. 29, 2021.
Third Office Action of Chinese Application No. 201780000768.0 dated Jan. 20, 2021.
Notification to Grant Patent Right for Invention of Chinese Application No. 201780000768.0 dated Apr. 2, 2021.
International Search Report and Written Opinion for International Application No. PCT/CN2017/096266, dated Mar. 28, 2018.
First Office Action of Chinese Application No. 201780000768.0 dated Aug. 27, 2019.
Second Office Action of Chinese Application No. 201780000768.0 dated May 19, 2020.
ETRI, *Discussion on control resource set and DMRS for DL control channel*, 3GPP TSG RAN WG1 NR Ad-Hoc Meeting, R1-1700581, Spokane, USA, Jan. 16-20, 2017, 5 pgs.

* cited by examiner

DATA TRANSMISSION METHOD, DEVICE AND COMPUTER READABLE STORAGE MEDIUM

CROSS REFERENCE TO RELATED APPLICATIONS

This application is a national phase application based on PCT/CN20171096266, filed Aug. 7, 2017, the content of which is incorporated herein by reference.

TECHNICAL FIELD

The present disclosure relates to the field of communication technologies, and in particular, to a data transmission method and device and a computer-readable storage medium.

BACKGROUND

In practical application, a communication system is usually required to support a plurality of service types, and different service types have different requirements on the wireless communication technology. For example, the enhanced mobile broadband (eMBB) service type mainly focuses on large bandwidth, high rates and the like; the ultra-reliable low latency communication (URLLC) service type mainly focuses on relatively high reliability and low latency; and the massive machine type communication (mMTC) service type mainly focuses on the large number of connections.

In order to meet different service requirements, a terminal needs to support multiplexing of a plurality of services. In long term evolution (LTE) system design, both uplink data transmission and downlink data transmission of the terminal are based on the scheduling by a base station. That is, the terminal is instructed by the base station to receive or transmit data at a corresponding resource location to achieve data transmission through different scheduling modes. In order to effectively achieve data transmission, for the terminal, how to distinguish different scheduling types becomes a research hotspot.

SUMMARY

For overcoming the problems existing in the relevant art, the present disclosure provides a data transmission method and device and a computer-readable storage medium.

In a first aspect, a data transmission method is provided. The method comprises:

receiving a scheduling signaling sent by a base station, wherein the scheduling signaling carries scheduling type indication information;

determining a scheduling type corresponding to the scheduling type indication information based on the scheduling type indication information and pre-stored configuration information, wherein the configuration information comprises a correspondence between a plurality of pieces of scheduling type indication information and a plurality of scheduling types; and performing resource scheduling based on the scheduling type, so as to achieve data transmission.

Optionally, when the scheduling type indication information is a length of the scheduling signaling, the configuration information comprises a correspondence between a plurality of lengths and a plurality of scheduling types.

Optionally, when the scheduling type indication information is a radio network temporary identifier (RNTI) in the scheduling signaling, the configuration information comprises a correspondence between a plurality of groups of RNTIs and a plurality of scheduling types, and various RNTIs in each group are configured to perform scrambling processing on scheduling signalings of a corresponding scheduling type, which have different scheduling functions.

Optionally, when the scheduling type indication information is a scrambling sequence, the configuration information comprises a correspondence between a plurality of scrambling sequences and a plurality of scheduling types, and each scrambling sequence is configured to perform scrambling processing on scheduling signaling of a corresponding scheduling type, which is obtained after performing scrambling processing based on the same group of RNTIs.

Optionally, when the scheduling type indication information is code indication information in a specified information field in the scheduling signaling with a length corresponding to a specified length, the configuration information comprises a correspondence between a plurality of pieces of code indication information and a plurality of scheduling types.

Optionally, when the scheduling type indication information is location information in a control resource set where the scheduling signaling is located, the configuration information comprises a correspondence between a plurality of pieces of location information and a plurality of scheduling types, and the plurality of pieces of location information comprise time-domain location information, frequency-domain location information and beam location information.

Optionally, before based on the scheduling type indication information and pre-stored configuration information, further comprising:

receiving and storing the configuration information sent by the base station.

Optionally, the configuration information is sent by the base station through radio resource control (RRC) signaling, a media access control (MAC) control element (CE) or physical layer signaling.

In a second aspect, a data transmission device is provided. The device comprises:

a receiving module, configured to receive a scheduling signaling sent by a base station, wherein the scheduling signaling carries scheduling type indication information;

a determining module, configured to determine a scheduling type corresponding to the scheduling type indication information based on the scheduling type indication information and pre-stored configuration information, wherein the configuration information comprises a correspondence between a plurality of pieces of scheduling type indication information and a plurality of scheduling types; and a transmitting module, configured to perform resource scheduling based on the scheduling type so as to achieve data transmission.

Optionally, when the scheduling type indication information is a length of the scheduling signaling, the configuration information comprises a correspondence between a plurality of lengths and a plurality of scheduling types.

Optionally, when the scheduling type indication information is a radio network temporary identifier (RNTI) in the scheduling signaling, the configuration information comprises a correspondence between a plurality of groups of RNTIs and a plurality of scheduling types, and various RNTIs in each group are configured to perform scrambling processing on the scheduling signalings of a corresponding scheduling type, which have different scheduling functions.

Optionally, when the scheduling type indication information is a scrambling sequence, the configuration information comprises a correspondence between a plurality of scrambling sequences and a plurality of scheduling types, and each of the plurality of scrambling sequences is configured to perform scrambling processing on the scheduling signaling of a corresponding scheduling type, which is obtained after performing scrambling processing based on a same group of RNTIs.

Optionally, when the scheduling type indication information is code indication information in a specified information field in the scheduling signaling with a length corresponding to a specified length, the configuration information comprises a correspondence between a plurality of pieces of code indication information and a plurality of scheduling types.

Optionally, when the scheduling type indication information is location information in a control resource set where the scheduling signaling is located, the configuration information comprises a correspondence between a plurality of pieces of location information and a plurality of scheduling types, and the plurality of pieces of location information comprise time-domain location information, frequency-domain location information and beam location information.

Optionally, the device further comprises:

a storing module, configured to receive and store the configuration information sent by the base station;

the configuration information is sent by the base station through a radio resource control (RRC) signaling, a media access control (MAC) control element (CE) or a physical layer signaling.

In a third aspect, a data transmission apparatus is provided. The apparatus comprises:

a processor; and a memory for storing an instruction executable by the process, wherein the processor is configured to execute any data transmission method according to the first aspect.

In a fourth aspect, a computer-readable storage medium having an instruction stored thereon is provided. The instruction implements any one of the data transmission methods according to the first aspect when being executed by a processor.

The technical solutions provided in embodiments of the present disclosure may comprise the following beneficial effects.

In the embodiments of the present disclosure, in order to achieve multiplexing of a plurality of service types, the terminal is required to support a plurality of types of scheduling modes for resource scheduling. In practical implementation, the terminal receives the scheduling signaling sent by the base station, wherein the scheduling signaling carries the scheduling type indication information; and then the terminal determines the scheduling type corresponding to the scheduling type indication information based on the scheduling type indication information and the pre-stored configuration information which comprises the correspondence between the plurality of pieces of scheduling type indication information and the plurality of scheduling types. That is, the scheduling types can be distinguished. Afterwards, the terminal can schedule the resources based on the scheduling type, so as to achieve data transmission.

It is to be understood that both the foregoing general description and the following detailed description are exemplary and illustrative only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Exemplary embodiments, examples of which are illustrated in the accompanying drawings, will be described in details. The same number in different drawings represents the same or the like elements when the following description involves the drawings, unless otherwise stated. The implementations set forth in the following description of exemplary embodiments do not represent all implementations consistent with the present disclosure. Instead, they are merely examples of apparatuses and methods consistent with aspects related to the disclosure as recited in the appended claims.

An application scenario and a system architecture which are involved in embodiments of the present disclosure are simply introduced firstly before the embodiments of the present disclosure will be explained in detail.

Firstly, the application scenario involved in the embodiments of the present disclosure will be simply introduced.

At present, as new Internet applications, such as augmented reality (AR)/virtual reality (VR) emerge one after another, the wireless communication technology is rapidly developed and evolved to meet application demands. In a practical application scenario, different service types have different demands on the wireless communication technology. One of the important characteristics of the new-generation communication technology is to support flexible configuration for a plurality of service types. In order to effectively implement different types of services, a plurality of types of scheduling modes are introduced into a communication system. For example, the plurality of types of scheduling modes comprises a slot (which represents a time frequency)-based scheduling mode and a symbol-based scheduling mode. Usually, in the process of service implementation, a base station instructs a terminal to use which scheduling type. Therefore, for the terminal, in order to effectively achieve data transmission, how to distinguish different scheduling types becomes a research hotspot. For this, an embodiment of the present disclosure provides a data transmission method. This data transmission method solves the problem on how to distinguish different scheduling types by the terminal. A reference can be made to embodiments illustrated in FIG. 1B, FIGS. 2-5, and FIG. 6A for the specific implementation of the data transmission method.

The system architecture involved in the embodiments of the present disclosure will be simply introduced hereafter after the application scenario involved in the embodiments of the present disclosure was introduced.

Figure 1A:
FIG. 1A is a diagram of system architecture according to an exemplary embodiment.

FIG. 1A is a diagram of a system architecture provided according to an exemplary embodiment. As illustrated in FIG. 1A, the system architecture mainly comprises a terminal 110 and a base station 120. The terminal 110 can access the base station 120 through a wireless communication network.

The base station 120 is mainly configured to send a scheduling signaling to the terminal 110 so as to notify the terminal 110 to adopt which scheduling type to schedule resources. In addition, the base station 120 is further configured to send configuration information to the terminal 110. The configuration information comprises a correspondence between a plurality of pieces of scheduling type indication information and a plurality of scheduling types.

The terminal 110 is mainly configured to implement the data transmission method according to the embodiments of the present disclosure. That is, the terminal 110 receives and stores the configuration information sent by the base station 120. It should be noted that the configuration information that is sent to the terminal 110 by the base station 120 is illustrated as an example here. In another embodiment, the configuration information may further be predefined, which is not limited in the embodiments of the present disclosure.

Further, when receiving the scheduling signaling sent by the base station 120, the terminal 110 determines, according to scheduling type indication information carried in the scheduling signaling and pre-stored configuration information, a scheduling type indicated by the base station 120. Further, the terminal 110 schedules resources based on the scheduling type to achieve data transmission. The specific implementation process of the data transmission method may refer to embodiments illustrated in FIG. 1B, FIGS. 2-5, and FIG. 6A.

It should be noted that during practical implementation, the terminal 110 may be any device capable of performing wireless communication. For example, the terminal 110 may be a mobile phone or the like, which is not limited in the embodiment of the present disclosure.

The embodiments of the present disclosure will be explained in detail below after the application scenario and the system architecture which are involved in the embodiments of the present disclosure have been introduced.

Figure 1B:
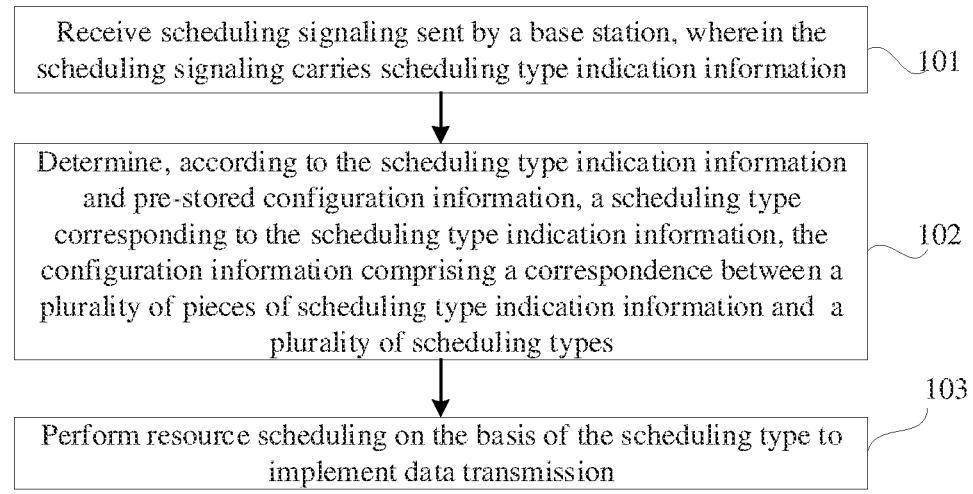
FIG. 1B is a flow chart of a data transmission method illustrated according to an exemplary embodiment.

FIG. 1B is a flow chart of a data transmission method illustrated according to an exemplary embodiment. As illustrated in FIG. 1B, the method comprises the following steps.

In step 101, a scheduling signaling sent by a base station is received, wherein the scheduling signaling carries scheduling type indication information.

In step 102, a scheduling type corresponding to the scheduling type indication information is determined based on the scheduling type indication information and pre-stored configuration information, wherein the configuration information comprises a correspondence between a plurality of pieces of scheduling type indication information and a plurality of scheduling types.

In step 103, resources are scheduled based oil the scheduling type to achieve data transmission.

In the embodiment of the present disclosure, in order to achieve multiplexing of a plurality of types of services, the terminal is required to support a plurality of types of scheduling modes for resource scheduling. In practical implementation, after the terminal receives the scheduling signaling sent by the base station, wherein the scheduling signaling carries the scheduling type indication information the terminal determines the scheduling type corresponding to the scheduling type indication information based on the scheduling type indication information and the pre-stored configuration information which comprises the correspondence between the plurality of pieces of scheduling type indication information and the plurality of scheduling types. That is, the scheduling types can be distinguished. Afterwards, the terminal may schedule the resources based on the scheduling type to achieve data transmission.

Optionally, when the scheduling type indication information is a length of the scheduling signaling, the configuration information comprises a correspondence between a plurality of lengths and a plurality of scheduling types.

Optionally, when the scheduling type indication information is a radio network temporary identifier (RNTI) in the scheduling signaling, the configuration information comprises a correspondence between a plurality of groups of RNTIs and a plurality of scheduling types. Various RNTIs in each group are configured to perform scrambling processing on scheduling signalings of a corresponding scheduling type, which have different scheduling functions.

Optionally, when the scheduling type indication information is a scrambling sequence, the configuration information comprises a correspondence between a plurality of scrambling sequences and a plurality of scheduling types. Each scrambling sequence is configured to perform scrambling processing on a scheduling signaling of a corresponding scheduling type, which is obtained after scrambling processing is performed based on the same group of RNTIs.

Optionally, when the scheduling type indication information is code indication information in a specified information field in the scheduling signaling with a length corresponding to a specified length, the configuration information comprises a correspondence between a plurality of pieces of code indication information and a plurality of scheduling types.

Optionally, when the scheduling type indication information is location information in a control resource set where the scheduling signaling is located, the configuration information comprises a correspondence between a plurality of pieces of location information and a plurality of scheduling types. The location information comprises time-domain location information, frequency-domain location information and beam location information.

Optionally, the method further comprises the following step before the scheduling type corresponding to the scheduling type indication information is determined based on the scheduling type indication information and the pre-stored configuration information:

the configuration information sent by the base station is received and stored.

Optionally, the configuration information is sent by the base station through a radio resource control (RRC) signaling, a media access control (MAC) control element (CE) or a physical layer signaling.

All the above optional technical solutions may form optional embodiments of the present disclosure according to any combined manner, which will be not elaborated herein.

In practical implementations, when contents comprised in the scheduling type indication information are different, the correspondences comprised in the configuration information are further different. That is, the terminal can distinguish scheduling types in various ways to achieve data transmission. Hereafter, the embodiments of the present disclosure will be described by referring embodiments illustrated in FIG. 1B, FIGS. 2-5, and FIG. 6A based on the situation that the contents comprised in the scheduling type indication information are different.

Figure 2:
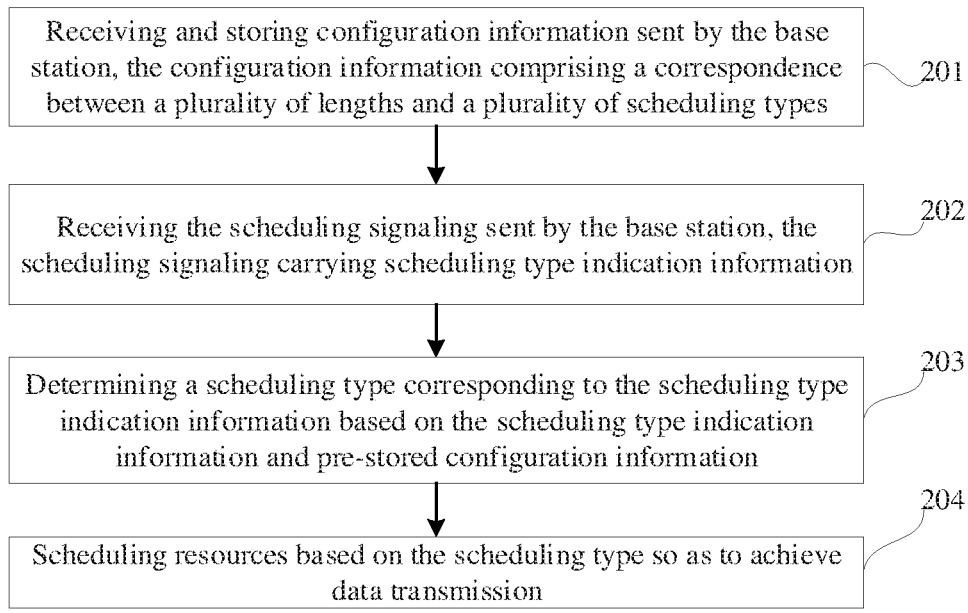
FIG. 2 is a flow chart of a data transmission method illustrated according to another exemplary embodiment.

FIG. 2 is a flow chart of a data transmission method illustrated according to an exemplary embodiment. As illustrated in FIG. 2, the data transmission method can be applicable to the system architecture illustrated in FIG. 1A. The embodiment of the present disclosure is illustrated with an example that the scheduling type indication information is a length of the scheduling signaling. The data transmission method may comprise several implementation steps as follows.

In step 201, configuration information sent by the base station is received and stored, wherein the configuration information comprises a correspondence between a plurality of lengths and a plurality of scheduling types.

Before the embodiment of the present disclosure is implemented, the base station can send configuration information to the terminal. Correspondingly, after receiving the configuration information, the terminal can store the configuration information locally, so that die terminal can subsequently determine a scheduling type corresponding to the received scheduling type indication information based on the configuration information. Subsequent steps can be referred for the details.

In practical implementation, the configuration information is sent to the terminal by the base station through an RRC signaling, a MAC CE, or a physical layer signaling.

In the embodiments of the present disclosure, when the scheduling type indication information is a length of the scheduling signaling, the configuration information comprises a correspondence between a plurality of lengths and a plurality of scheduling types.

For example, in a possible implementation mode, a correspondence between a plurality of lengths and a plurality of scheduling types, which is comprised in the configuration information, may be as illustrated in Table 1a.

TABLE 1a

| Length of scheduling signaling | Scheduling type |
|---|---|
| $L_1$ | type 1 |
| $L_2$ | type 2 |
| ... | ... |
| $L_m$ | type m |

It should be noted that the embodiment of the present disclosure is described only by taking what is illustrate in table 1 is the correspondence between the plurality of lengths and the plurality of scheduling types as an example. In another embodiment, the correspondence between the plurality of lengths and the plurality of scheduling types may be in other forms, which is not limited in the embodiments of the present disclosure.

Or, in another possible implementation mode, the configuration information may further comprise a correspondence between a plurality of length ranges and a plurality of scheduling types. That is, in practical implementation, one or more length ranges of scheduling signalings can be defined, and thus the correspondence between the plurality of length ranges and the plurality of scheduling types, which is comprised in the configuration information, may be as illustrated in Table 1b as below.

TABLE 1b

| Length of scheduling signaling | Scheduling type |
|---|---|
| less than or equal to $L_1$ | type 1 |
| greater than $L_1$, less than or equal to $L_2$ | type 2 |
| ... | ... |
| greater than $L_{m-1}$, less than or equal to $L_m$ | type m |

It should further be noted that in the embodiment of the present disclosure, the embodiment of the present disclosure is described by just taking that the base station sends the configuration information to the terminal as an example. In practical implementation, the configuration information may further be predefined, which is not limited in the embodiments of the present disclosure.

In step 202, the scheduling signaling sent by the base station is received, wherein the scheduling signaling carries scheduling type indication information.

Since a plurality of types of scheduling modes are introduced into the communication system, it needs to instruct, by the base station, the terminal to use which scheduling type to schedule resources before transmitting data between the terminal and the base station. For this, the base station sends the scheduling signaling carries the scheduling type indication information. Here, the scheduling type indication information is a length of the scheduling signaling. For example, the length of the scheduling signaling is $L_2$. That is, in the embodiment of the present disclosure, the terminal can distinguish different scheduling types through detecting the length of the scheduling signaling.

In addition, in practical implementation, the scheduling signaling can be implemented through a downlink control information (DCI).

In step 203, a scheduling type corresponding to the scheduling type indication information is determined based on the scheduling type indication information and pre-stored configuration information.

As described above, the terminal pre-stores the configuration information comprising the correspondence between the plurality of lengths and the plurality of scheduling types, as illustrated in Table 1a. Therefore, the terminal can determine the scheduling type corresponding to the scheduling type indication information based on the scheduling type indication information and the pre-stored configuration information.

For example, when the scheduling type indication information is the length of the scheduling signaling and the length of scheduling signaling is $L_2$, it can be determined that the scheduling type corresponding to the scheduling type indication information is the scheduling type 2, according to the correspondence between the plurality of lengths and the plurality of scheduling types illustrated in Table 1a above.

Or, as described above, the terminal pre-stores the configuration information comprising the correspondence between the plurality of length ranges and the plurality of scheduling types, as illustrated in Table 1b. Therefore, the terminal can determine the scheduling type corresponding to the scheduling type indication information based on the scheduling type indication information and the pre-stored configuration information.

For example, when the scheduling type indication information is the length of the scheduling signaling and the length of scheduling signaling is $L_2$, it can be determined that the scheduling type corresponding to the scheduling type indication information is the scheduling type 2, according to the correspondence between the plurality of length ranges and the plurality of scheduling types illustrated in Table 1b above.

In step 204, resources are scheduled based on the scheduling type so as to achieve data transmission.

After determining the scheduling type according to the length of the scheduling signaling and the pre-stored configuration information through the above implementation process, the terminal can schedule resources based on the scheduling type. For example, if the scheduling type is a slot-based scheduling, resources can be scheduled through a slot-based scheduling mode to achieve data transmission.

In the embodiment of the present disclosure, in order to achieve multiplexing of a plurality of types of services, the terminal is required to support a plurality of types of scheduling modes for resource scheduling. In practical implementation, the terminal receives the scheduling signaling sent by the base station, wherein the scheduling signaling carries the scheduling type indication information; and then the terminal determines the scheduling type corresponding to the scheduling type indication information based on the scheduling type indication information and the pre-stored configuration information which comprises the correspondence between the plurality of pieces of scheduling type indication information and the plurality of scheduling types. That is, the scheduling types can be distinguished. Afterwards, the terminal can schedule the resources based on the scheduling type so as to achieve data transmission.

Figure 3:
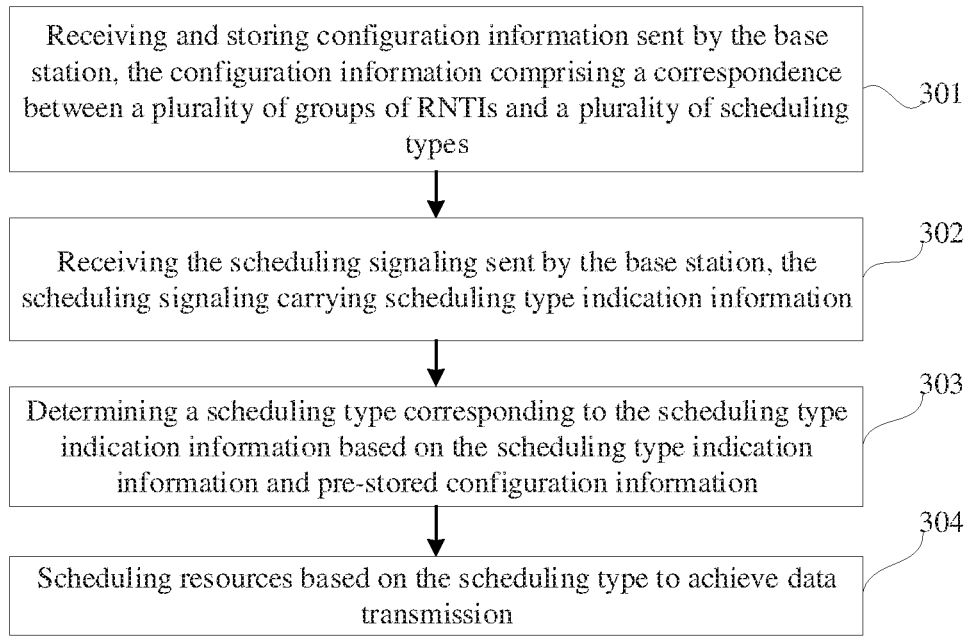
FIG. 3 is a flow chart of a data transmission method illustrated according to another exemplary embodiment.

FIG. 3 is a flow chart of a data transmission method illustrated according to an exemplary embodiment. As illustrated in FIG. 3, this data transmission method can be applicable to the system architecture illustrated in FIG. 1A. The embodiment of the present disclosure is illustrated with an example that the scheduling type indication information is a radio network temporary identifier (RNTI) in the scheduling signaling. The data transmission method may comprise several implementation steps as follows.

In step 301, configuration information sent by the base station is received and stored, wherein the configuration information comprises a correspondence between a plurality of groups of RNTIs and a plurality of scheduling types.

Before the embodiment of the present disclosure is implemented, the base station may send the configuration information to the terminal. Correspondingly, after receiving the configuration information, the terminal may store the configuration information locally, so that the terminal may subsequently determine a scheduling type corresponding to the received scheduling type indication information based on the configuration information. Subsequent steps can be referred to for the details.

In practical implementation, the configuration information is sent to the terminal by the base station through an RRC signaling, a MAC CE, or a physical layer signaling.

In the embodiment of the present disclosure, when the scheduling type indication information is an RNTI in the scheduling signaling, the configuration information comprises a correspondence between a plurality of groups of RNTIs and a plurality of scheduling types.

For example, in one possible implementation mode, the correspondence between the plurality of groups of RNTIs and the plurality of scheduling types, which is comprised in the configuration information, can be as illustrated in Table 2.

TABLE 2

| Group number | RNTI value | scheduling type |
|---|---|---|
| group 1 | RNTI_11, RNTI_12, ... RNTI_1N | type 1 |
| group 2 | RNTI_21, RNTI_22, ... RNTI_2N | type 2 |
| ... | | ... |
| group N | RNTI_N1, RNTI_N2, ... RNTI_NN | type m |

It should be noted that the embodiment of the present disclosure is only illustrated with an example that the correspondence between the plurality of groups of RNTIs and the plurality of scheduling types is as illustrated in table 2. In another embodiment, the correspondence between the plurality of groups of RNTIs and the plurality of scheduling types may be in other forms, which is not limited in the embodiment of the present disclosure.

Various RNTIs in each group are configured to perform scrambling processing on scheduling signalings of a corresponding scheduling type, which has different scheduling functions. That is, in the embodiment of the present disclosure, a plurality of groups of RNTIs may be defined, each group of RNTIs corresponds to one scheduling type, and various RNTIs in the same group are configured to perform scrambling processing on various scheduling signalings having different scheduling functions, of a scheduling type corresponding to this group, respectively.

For example, the scheduling type corresponding to the group 1 above is the scheduling type 1, in group 1, RNTI_11 may be configured to perform scrambling processing on scheduling signaling a having scheduling function A, RNTI_12 may be configured to perform scrambling processing on scheduling signaling b having scheduling function B, and so on, RNTI_1N may be configured to perform scrambling processing on scheduling signaling n having scheduling function N. The scheduling types of scheduling signaling a, scheduling signaling b, . . . , and scheduling signaling n are the scheduling type 1.

It should further be noted that in the embodiment of the present disclosure is described by taking that the configuration information is sent to the terminal by the base station as an example. In practical implementation, the configuration information may further be predefined, which is not limited in the embodiment of the present disclosure.

In step 302, the scheduling signaling sent by the base station is received, wherein the scheduling signaling carries scheduling type indication information.

Since a plurality of types of scheduling modes are introduced into the communication system, it needs to instruct, by the base station, the terminal to use which scheduling type to schedule resources before data is transmitted between the terminal and the base station. For this, the scheduling type indication information is carried by the scheduling signaling sent by the base station. Here, the scheduling type indication information is the RNTI in the scheduling signaling. For example, the RNTI in the scheduling signaling is RNTI_12. That is, in the embodiment of the present disclosure, the terminal can distinguish different scheduling types according to the group, to which RNTIs in the scheduling signaling belong.

In addition, in practical implementation, the scheduling signaling can be transmitted through downlink control information (DCI).

In step 303, a scheduling type corresponding to the scheduling type indication information is determined based on the scheduling type indication information and pre-stored configuration information.

As described above, the terminal pre-stores the configuration information including the correspondence between the plurality of groups of RNTIs and the plurality of scheduling types, as illustrated in Table 2. Therefore, the terminal can determine the scheduling type corresponding to the scheduling type indication information based on the scheduling type indication information and the pre-stored configuration information.

For example, when the scheduling type indication information is the RNTI in the scheduling signaling and the RNTI in the scheduling signaling is RNTI_12, it can be determined, according to the correspondence between the plurality of groups of RNTIs and the plurality of scheduling types illustrated in Table 2 above, that the scheduling type corresponding to the scheduling type indication information is the scheduling type 1.

In step 304, resources are scheduled based on the scheduling type to achieve data transmission.

After determining the scheduling type according to the RNTI in the scheduling signaling and the pre-stored configuration information through the above implementation process, the terminal may schedule resources based on the scheduling type. For example, if the scheduling type is a slot-based scheduling, resources can be scheduled through a slot-based scheduling type to achieve data transmission.

In the embodiment of the present disclosure, in order to achieve multiplexing of a plurality of types of services, the terminal needs to support a plurality of types of scheduling modes for resource scheduling. In practical implementation, the terminal receives the scheduling signaling sent by the base station, wherein the scheduling signaling carries the scheduling type indication information; and then the terminal determines the scheduling type corresponding to the scheduling type indication information based on the scheduling type indication information and the pre-stored configuration information which comprises the correspondence between the plurality of pieces of scheduling type indication information and the plurality of scheduling types. That is, the scheduling types can be distinguished. Afterwards, the terminal may schedule the resources based on the scheduling type to achieve data transmission.

Figure 4:
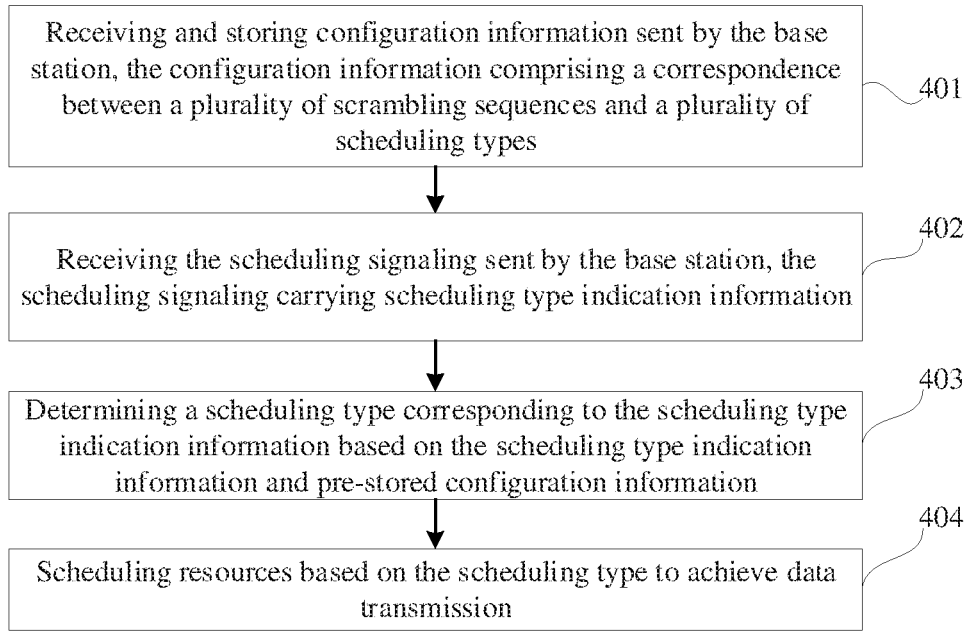
FIG. 4 is a flow chart of a data transmission method illustrated according to another exemplary embodiment.

FIG. 4 is a flow chart of a data transmission method illustrated according to one exemplary embodiment. As illustrated in FIG. 4, this data transmission method can be applicable to the system architecture illustrated in FIG. 1A. The embodiment of the present disclosure is illustrated by taking that the scheduling type indication information is a scrambling sequence as an example. The data transmission method may comprise several implementation steps as follows.

In step 401, configuration information sent by the base station is received and stored, wherein the configuration information comprises a correspondence between a plurality of scrambling sequences and a plurality of scheduling types.

Before the embodiment of the present disclosure is implemented, the base station may send the configuration information to the terminal. Correspondingly, after receiving the configuration information, the terminal may store the configuration information locally, so that the terminal may subsequently determine a scheduling type corresponding to the received scheduling type indication information based on the configuration information. Subsequent steps are referred to for the details.

In practical implementation, the configuration information is sent to the terminal by the base station through an RRC signaling, a MAC CE, or a physical layer signaling.

In the embodiment of the present disclosure, when the scheduling type indication information is a scrambling sequence, the configuration information comprises a correspondence between a plurality of scrambling sequences and a plurality of scheduling types.

For example, in one possible implementation mode, a correspondence between a plurality of scrambling sequences and a plurality of scheduling types, which is comprised in the configuration information, can be as illustrated in Table 3.

TABLE 3

| Scrambling sequence | Scheduling type |
|---|---|
| $array_1$ | type 1 |
| $array_2$ | type 2 |
| ... | ... |
| $array_m$ | type m |

It should be noted that the embodiment of the present disclosure is only described by taking that the correspondence between the plurality of scrambling sequences and the plurality of scheduling types is what is illustrated in Table 3 as an example. In another embodiment, the correspondence between the plurality of scrambling sequences and the plurality of scheduling types may be in other forms, which is not limited in the embodiment of the present disclosure.

Each scrambling sequence is configured to perform scrambling processing on scheduling signaling of the corresponding scheduling type, which is obtained after scrambling processing is performed based on the same group of RNTIs. That is, in the embodiment of the present disclosure, the base station merely defines one group of RNTIs. Since the scheduling types cannot be distinguished according to the RNTIs belonging to the same group, in order to distinguish different scheduling types, a plurality of scrambling sequences are defined here, and each scrambling sequence corresponds to one scheduling type, so that the terminal subsequently acquires the corresponding scheduling type by detecting the scrambling sequence.

It should further be noted that the embodiment of the present disclosure is described by taking that the configuration information is sent to the terminal by the base station as an example. In practical implementation, the configuration information may further be predefined, which is not limited in the embodiment of the present disclosure.

In step 402, the scheduling signaling sent by the base station is received, wherein the scheduling signaling carries the scheduling type indication information.

Since a plurality of types of scheduling modes are introduced into the communication system, it needs to instruct, by the base station, the terminal to use which scheduling type to schedule resources before data is transmitted between the terminal and the base station. For this, the scheduling type indication information is carried in the scheduling signaling sent by the base station. Here, the scheduling type indication information is the scrambling sequence. For example, the scrambling sequence is $array_1$. That is, in the embodiment of the present disclosure, the terminal can distinguish different scheduling types through detecting the scrambling sequence.

In addition, in practical implementation, the scheduling signaling may be implemented through downlink control information (DCI).

In step 403, a scheduling type corresponding to the scheduling type indication information is determined based on the scheduling type indication information and pre-stored configuration information.

As described above, the terminal pre-stores the configuration information including the correspondence between the plurality of scrambling sequences and the plurality of scheduling types, as illustrated in table 3. Therefore, the terminal can determine the scheduling type corresponding to the scheduling type indication information based on the scheduling type indication information and the pre-stored configuration information.

For example, when the scheduling type indication information is a scrambling sequence and the scrambling sequence is $array_1$, it can be determined, according to the correspondence between the plurality of scrambling sequences and the plurality of scheduling types illustrated in Table 3 above, that the scheduling type corresponding to the scheduling type indication information is the scheduling type 1.

In step 404, resources are scheduled based on the scheduling type to achieve data transmission.

After determining the scheduling type according to the scrambling sequence in the scheduling signaling and the pre-stored configuration information through the above implementation process, the terminal can schedule resources based on the scheduling type. For example, if the scheduling type is slot-based scheduling, resources can be scheduled through a slot-based scheduling type to achieve data transmission.

In the embodiment of the present disclosure, in order to achieve multiplexing of a plurality of types of services, the terminal needs to support a plurality of types of scheduling modes for resource scheduling. In practical implementation, the terminal receives the scheduling signaling sent by the base station, wherein the scheduling signaling carries the scheduling type indication information; and then the terminal determines the scheduling type corresponding to the scheduling type indication information based on the scheduling type indication information and the pre-stored configuration information which comprises the correspondence between the plurality of pieces of scheduling type indication information and the plurality of scheduling types. That is, the scheduling types can be distinguished. Afterwards, the terminal can schedule the resources based on the scheduling type to achieve data transmission.

Figure 5:
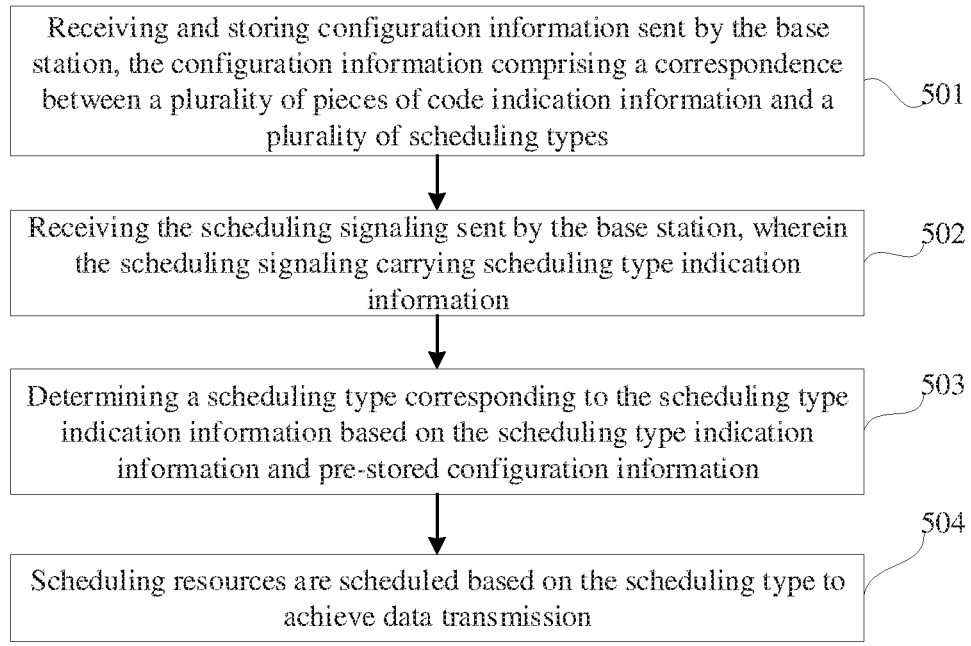
FIG. 5 is a flow chart of a data transmission method illustrated according to another exemplary embodiment.

FIG. 5 is a flow chart of a data transmission method illustrated according to one exemplary embodiment. As illustrated in FIG. 5, this data transmission method can be applicable to the system architecture illustrated in FIG. 1A. The embodiment of the present disclosure is described by taking as an example that the scheduling type indication information is code indication information in a specified information field in the scheduling signaling with a length corresponding to a specified length. The data transmission method may comprise several implementation steps as follows.

In step 501, configuration information sent by the base station is received and stored, wherein the configuration information comprises a correspondence between a plurality of pieces of code indication information and a plurality of scheduling types.

Before the embodiment of the present disclosure is implemented, the base station can send the configuration information to the terminal. Correspondingly, after receiving the configuration information, the terminal may store the configuration information locally, so that the terminal can subsequently determine a scheduling type corresponding to the received scheduling type indication information based on the configuration information. Subsequent steps can be referred to for the details.

In practical implementation, the configuration information is sent to the terminal by the base station through an RRC signaling, a MAC CE, or a physical layer signaling.

In the embodiment of the present disclosure, when the scheduling type indication information is code indication information in s specified information field in the scheduling signaling with a length corresponding to a specified length, the configuration information comprises a correspondence between a plurality of pieces of code indication information and a plurality of scheduling types.

The specified information field may be in a fixed location in the scheduling signaling. The specified length may further be set in advance according to actual requirements. For example, when the communication system supports four different scheduling types, the specified length may be 2. Further, the code indication information may specifically be "00", "01", "10" and "11".

For example, in one possible implementation mode, the correspondence between the plurality of pieces of code indication information and the plurality of scheduling types may be as illustrated in Table 4.

TABLE 4

| Code indication information | Scheduling type |
| --- | --- |
| 00 | type 1 |
| 01 | type 2 |
| 10 | type 3 |
| 11 | type 4 |

It should be noted that the embodiment of the present disclosure is described only by taking that the correspondence between the plurality of pieces of code indication information and the plurality of scheduling types is as illustrated in Table 4 as an example. In another embodiment, the correspondence between the plurality of pieces of code indication information and the plurality of scheduling types may be in other forms, which is not limited in the embodiment of the present disclosure.

It should further be noted that the embodiment of the present disclosure is described by taking that the configuration information is sent to the terminal by the base station as an example. In practical implementation, the configuration information may further be predefined, which is not limited in the embodiment of the present disclosure.

In step 502, the scheduling signaling sent by the base station is received, wherein the scheduling signaling carries the scheduling type indication information.

Since a plurality of scheduling types are introduced into the communication system, it needs to instruct, by the base station, the terminal to use which scheduling type to schedule resources before data is transmitted between the terminal and the base station. For this, the scheduling signaling is carried on the scheduling type indication information sent by the base station. Here, the scheduling type indication information is code indication information in a specified information field in the scheduling signaling, with a length corresponding to a specified length. For example, the code indication information is "10". That is, in the embodiment of the present disclosure, the terminal can distinguish different scheduling types through detecting the code indication information in the specified information field in the scheduling signaling, the length of the specified information field corresponding to the specified length.

In addition, in practical implementation, the scheduling signaling may be implemented through downlink control information (DCI).

In step 503, a scheduling type corresponding to the scheduling type indication information is determined based on the scheduling type indication information and pre-stored configuration information.

As described above, the terminal pre-stores the configuration information including the correspondence between the plurality of pieces of code indication information and the plurality of scheduling types, as illustrated in Table 4. Therefore, the terminal can determine the scheduling type corresponding to the scheduling type indication information based on the scheduling type indication information and the pre-stored configuration information.

For example, when the scheduling type indication information is code indication information in a specified information field in the scheduling signaling with a length corresponding to a specified length, and the code indication information is "10", it can be determined, according to the correspondence between the plurality of pieces of code indication information and the plurality of scheduling types illustrated in Table 4 above, that the scheduling type corresponding to the scheduling type indication information is the scheduling type 3.

In step 504, resources are scheduled based on the scheduling type to achieve data transmission.

After determining the scheduling type, according to the code indication information in the specified information field in the scheduling signaling with a length corresponding to the specified length and the pre-stored configuration information through the above implementation process, the terminal can schedule resources based on the scheduling type. For example, if the scheduling type is slot-based scheduling, resources may be scheduled through a slot-based scheduling type to achieve data transmission.

In the embodiment of the present disclosure, in order to achieve multiplexing of a plurality of types of services, the terminal needs to support a plurality of types of scheduling modes for resource scheduling. In practical implementation, the terminal receives the scheduling signaling sent by the base station, wherein the scheduling signaling carries the scheduling type indication information; and then the terminal determines the scheduling type corresponding to the scheduling type indication information based on the scheduling type indication information and the pre-stored configuration information which comprises the correspondence between the plurality of scheduling type indication information and the plurality of scheduling types. That is, the scheduling types can be distinguished. Afterwards, the terminal can schedule the resources based on the scheduling type to achieve data transmission.

Figure 6A:
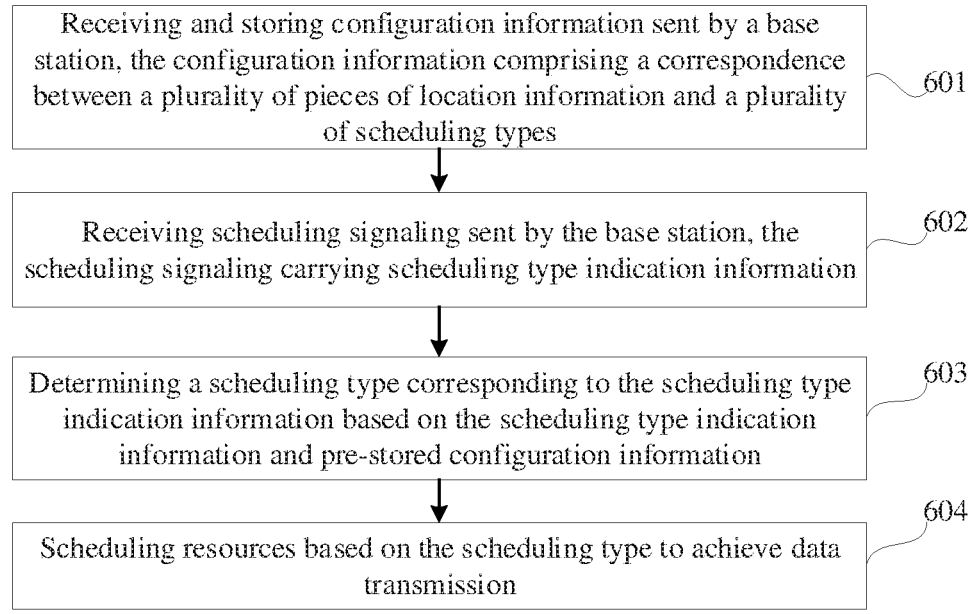
FIG. 6A is a flow chart of a data transmission method illustrated according to another exemplary embodiment.

FIG. 6A is a flow chart of a data transmission method illustrated according to one exemplary embodiment. As illustrated in FIG. 6A, this data transmission method can be applicable to the system architecture illustrated in FIG. 1A. The embodiment of the present disclosure is described by taking that the scheduling type indication information is location information in a control resource set where the scheduling signaling is located, as an example. The data transmission method may comprise several implementation steps as follows.

In step 601, configuration information sent by a base station is received and stored, wherein the configuration information comprises a correspondence between a plurality of pieces of location information and a plurality of scheduling types.

Before the embodiment of the present disclosure is implemented, the base station may send the configuration information to the terminal. Correspondingly, after receiving the configuration information, the terminal may store the configuration information locally, so that the terminal may subsequently determine a scheduling type corresponding to the received scheduling type indication information based on the configuration information. Subsequent steps can be referred for the details.

In practical implementation, the configuration information is sent to the terminal by the base station through an RRC signaling, a MAC CE, or a physical layer signaling.

In the embodiment of the present disclosure, when the scheduling type indication information is location information in the control resource set (CORESET) where the scheduling signaling is located, the configuration information comprises a correspondence between a plurality of pieces of location information and a plurality of scheduling types.

The location information comprises time-domain location information, frequency-domain location information and beam location information. The terminal can uniquely determine that the scheduling signaling is on which symbols of the slot on the transmission unit, based on the time-domain location information, the frequency-domain location information and the beam location information.

Figure 6B:
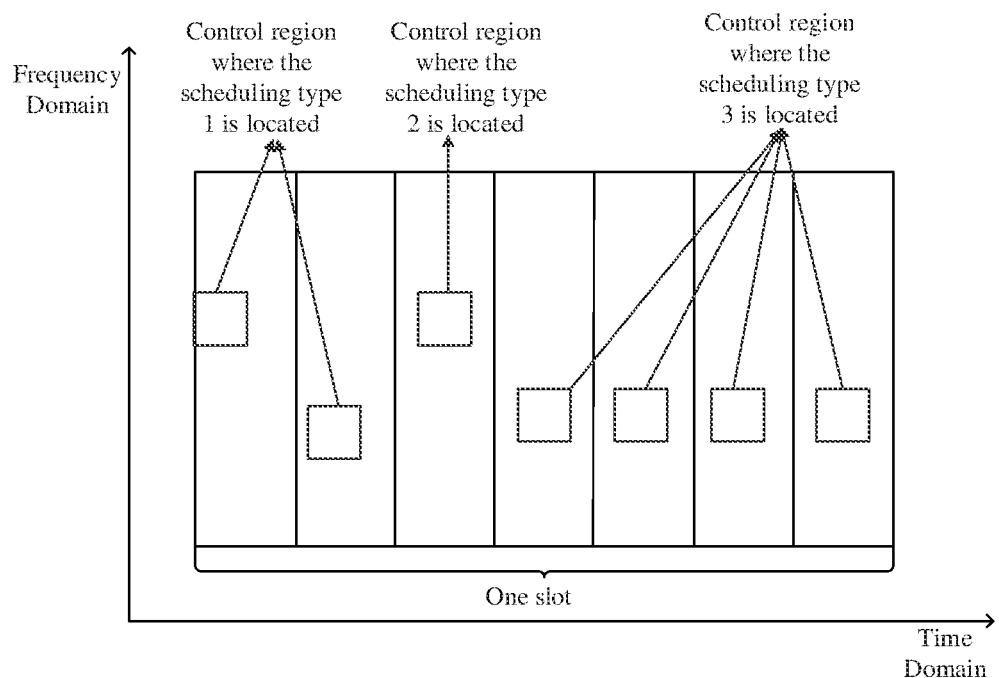
FIG. 6B is a location diagram of a scheduling signaling, which is involved in the embodiment of FIG. 6A, in a control resource set.

For example, in one possible implementation mode, as illustrated in FIG. 6B, when it is determined, based on the time-domain location information, the frequency-domain location information and the beam location information, that the scheduling signaling is on the first two symbols of the slot, the scheduling type corresponding to the location information is the scheduling type 1; when it is determined that the scheduling signaling is on the third symbol of the slot based on the time-domain location information, the frequency-domain location information and the beam location information, the scheduling type corresponding to the location information is the scheduling type 2; and when it is determined, based on the time-domain location information, the frequency-domain location information and the beam location information, that the scheduling signaling is in another location, the scheduling type corresponding to the location information is the scheduling type 3.

It should further be noted that the embodiment of the present disclosure is described by taking that the base station sends the configuration information to the terminal as arm example. In practical implementation, the configuration information may further be predefined, which is not limited in the embodiment of the present disclosure.

In step 602, the scheduling signaling sent by the base station is received, wherein the scheduling signaling carries scheduling type indication information.

Since a plurality of types of scheduling modes are introduced into the communication system, it needs to instruct, by the base station, the terminal to use which scheduling type to schedule resources before data is transmitted between the terminal and the base station. For this, the scheduling type indication information is carried in the scheduling signaling sent by the base station. Here, the scheduling type indication information is location information in a control resource set (CORESET) where the scheduling signaling is located. For example, the location information in the CORESET where the scheduling signaling is located is on the third symbol on a slot. That is, in the embodiment of the present disclosure, the terminal can distinguish different scheduling types through detecting the location information in the CORESET where the scheduling signaling is located.

In addition, in practical implementation, the scheduling signaling may be implemented through Downlink Control Information (DCI).

In step 603, a scheduling type corresponding to the scheduling type indication information is determined based on the scheduling type indication information and pre-stored configuration information.

As described above, the terminal pre-stores the configuration information including a correspondence between the plurality of pieces of location information and the plurality of scheduling types, as illustrated in FIG. 6B. Therefore, the terminal can determine the scheduling type corresponding to the scheduling type indication information based on the scheduling type indication information and the pre-stored configuration information.

For example, when the scheduling type indication information is the location information in the CORESET where the scheduling signaling is located and the location information in the CORESET where the scheduling signaling is located indicates that the scheduling signaling is on the third symbol of the slot, it can be seen from FIG. 6B that the scheduling type corresponding to the scheduling type indication information is the scheduling type 2.

In step 604, resources are scheduled based on the scheduling type to achieve data transmission.

After determining the scheduling type according to the location information in the CORESET where the scheduling signaling is located and the pre-stored configuration information through the above implementation process, the terminal can schedule resources based on the scheduling type. For example, if the scheduling type is a slot-based scheduling, resources can be scheduled through the slot-based scheduling type to achieve data transmission.

In the embodiment of the present disclosure, in order to achieve multiplexing of a plurality of types of services, the terminal needs to support a plurality of types of scheduling modes for resource scheduling. In practical implementation, the terminal receives the scheduling signaling sent by the base station, wherein the scheduling signaling carries the scheduling type indication information; and then the terminal determines the scheduling type corresponding to the scheduling type indication information based on the scheduling type indication information and the pre-stored configuration information which comprises the correspondence between the plurality of pieces of scheduling type indication information and the plurality of scheduling types. That is, the scheduling types can be distinguished. Afterwards, the terminal can schedule the resources based on the scheduling type to achieve data transmission.

Figure 7A:
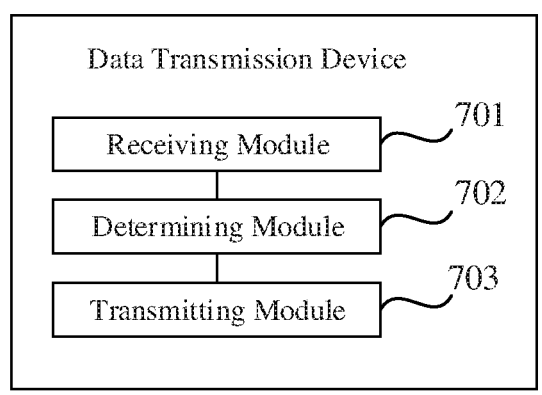
FIG. 7A is a block diagram of a data transmission device illustrated according to an exemplary embodiment.

FIG. 7A is a block diagram of a data transmission device illustrated according to an exemplary embodiment. As illustrated in FIG. 7A, the device comprises:

a receiving module 701 configured to receive scheduling signaling sent by a base station, wherein the scheduling signaling carries scheduling type indication information;

a determining module 702 configured to determine a scheduling type corresponding to the scheduling type indication information based on the scheduling type indication information and pre-stored configuration information, wherein the configuration information comprises a correspondence between a plurality of pieces of scheduling type indication information and a plurality of scheduling types; and a transmitting module 703 configured to schedule resources based on the scheduling type to achieve data transmission.

Optionally, when the scheduling type indication information is a length of the scheduling signaling, the configuration information comprises a correspondence between a plurality of lengths and a plurality of scheduling types.

Optionally, when the scheduling type indication information is a radio network temporary identifier (RNTI) in the scheduling signaling, the configuration information comprises a correspondence between a plurality of groups of RNTIs and a plurality of scheduling types. Various RNTIs in each group are configured to perform scrambling processing on scheduling signalings of a corresponding scheduling type, which have different scheduling functions.

Optionally, when the scheduling type indication information is a scrambling sequence, the configuration information comprises a correspondence between a plurality of scrambling sequences and a plurality of scheduling types. Each scrambling sequence is configured to perform scrambling processing on the scheduling signaling of a corresponding scheduling type, which is obtained after scrambling processing is performed on the scheduling signaling based on the same group of RNTIs.

Optionally, when the scheduling type indication information is code indication information in the specified information field in the scheduling signaling with a length corresponding to a specified length, the configuration information comprises a correspondence between a plurality of pieces of code indication information and a plurality of scheduling types.

Optionally, when the scheduling type indication information is location information in a control resource set where the scheduling signaling is located, the configuration information comprises a correspondence between a plurality of pieces of location information and a plurality of scheduling types. The location information comprises time-domain location information, frequency-domain location information and beam location information.

Figure 7B:
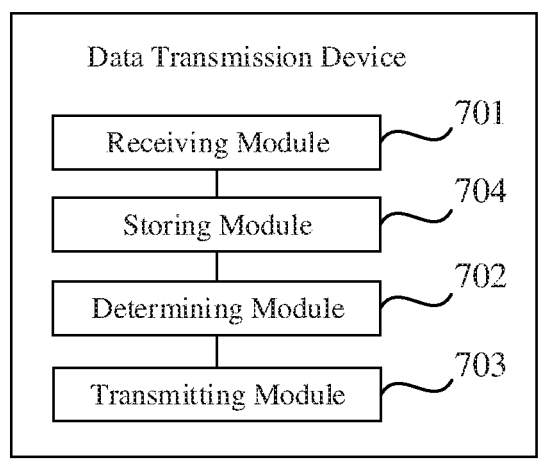
FIG. 7B is a block diagram of another data transmission device illustrated according to an exemplary embodiment.

Optionally, with reference to FIG. 7B, the device further comprises:

a storing module 704 configured to receive and store the configuration information sent by the base station.

Optionally, the configuration information is sent by the base station through an RRC signaling, a MAC CE, or a physical layer signaling.

In the embodiment of the present disclosure, in order to achieve multiplexing of a plurality of types of services, the terminal needs to support a plurality of types of scheduling modes for resource scheduling. In practical implementation, the terminal receives the scheduling signaling sent by the base station, wherein the scheduling signaling carries the scheduling type indication information; and then the terminal determines the scheduling type corresponding to the scheduling type indication information based on the scheduling type indication information and the pre-stored configuration information which comprises the correspondence between the plurality of pieces of scheduling type indication information and the plurality of scheduling types. That is, the scheduling types can be distinguished. Afterwards, the terminal can schedule the resources based on the scheduling type to achieve data transmission.

For the device in the above embodiment, the specific mode of each module for executing its respective operations has been described in detail in the embodiment of the related method and is not further described in detail herein.

Figure 8:
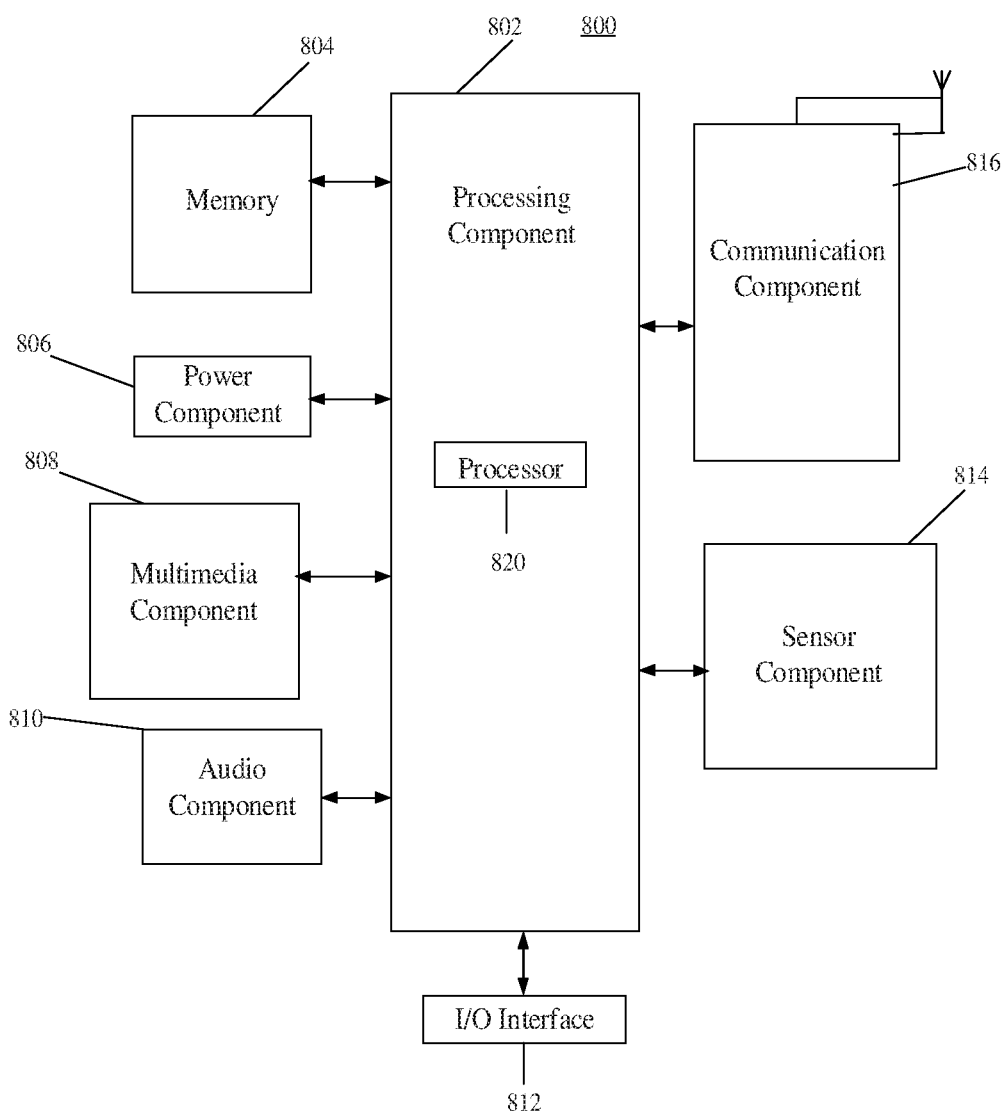
FIG. 8 is a block diagram of a data transmission apparatus 800 illustrated according to an exemplary embodiment.

FIG. 8 is a block diagram of an apparatus 800 in accordance with an exemplary embodiment. For example, the apparatus 800 may be a mobile phone, a computer, a digital broadcast terminal, a messaging device, a gaming console, a tablet device, a medical device, a fitness equipment, a personal digital assistant, and the like.

Referring to FIG. 8, the apparatus 800 may comprise one or more of the following components: a processing component 802, a memory 804, a power component 806, a multimedia component 808, an audio component 810, an input/output (I/O) interface 812, a sensor component 814, and a communication component 816.

The processing component 802 typically controls the overall operations of the apparatus 800, such as the operations associated with display, telephone calls, data communications, camera operations, and recording operations. The processing component 802 may comprise one or more processors 820 to execute instructions to perform all or part of the steps in the above described methods. Moreover, the processing component 802 may comprise one or more modules which facilitate the interactions between the processing component 802 and other components. For instance, the processing component 802 may comprise a multimedia module to facilitate the interaction between the multimedia component 808 and the processing component 802.

The memory 804 is configured to store various types of data to support the operation of the apparatus 800. Examples of such data comprise instructions for any applications or methods operated on the apparatus 800, contact data, phonebook data, messages, pictures, videos, etc. The memory 804 may be implemented through any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may comprise a power management system, one or more power sources, and any other components associated with generation, management, and distribution of power in the apparatus 800.

The multimedia component 808 comprises a screen providing an output interface between the apparatus 800 and the user. In some embodiments, the screen may comprise a liquid crystal display (LCD) and a touch panel (TP). If the screen comprises the touch panel, the screen may be implemented as a touch screen to receive input signals from the user. The touch panel comprises one or more touch sensors to sense touches, swipes, and gestures on the touch panel. The touch sensors may not only sense a boundary of a touch or swipe action, but further sense the duration and pressure associated with the touch or swipe action. In some embodiments, the multimedia component 808 comprises a front camera and/or a rear camera. The front camera and the rear camera may receive external multimedia data while the apparatus 800 is in an operation mode, such as a shooting mode or a video mode. Each of the front camera and the rear camera may be a fixed optical lens system or have focus and optical zoom capability.

The audio component 810 is configured to output and/or input audio signals. For example, the audio component 810 comprises a microphone (MIC) configured to receive external audio signals when the apparatus 800 is in an operation mode, such as a call mode, a recording mode, and a voice recognition mode. The received audio signal may be further stored in the memory 804 or transmitted via the communication component 816. In some embodiments, the audio component 810 further comprises a speaker for outputting audio signals.

The I/O interface 812 provides an interface between the processing component 802 and peripheral interface modules, such as a keyboard, a click wheel, buttons, and the like. The buttons may comprise, but are not limited to, a home button, a volume button, a start button, and a locking button.

The sensor component 814 comprises one or more sensors to provide status assessments of various aspects of the apparatus 800. For instance, the sensor component 814 may detect an on/off status of the apparatus 800, relative positioning of components, e.g., the display device and the mini keyboard of the apparatus 800, and the sensor component 814 may further detect a position change of the apparatus 800 or a component of the apparatus 800, presence or absence of user contact with the apparatus 800, orientation or acceleration/deceleration of the apparatus 800, and temperature change of the apparatus 800. The sensor component 814 may comprise a proximity sensor configured to detect the presence of nearby objects without any physical contact. The sensor component 814 may further comprise a light sensor, such as a CMOS or CCD image sensor, used for imaging applications. In some embodiments, the sensor component 814 may further comprise an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2G, or 3G, or a combination thereof. In an exemplary embodiment, the communication component 816 receives broadcast signals or broadcast associated information from an external broadcast management system via a broadcast channel. In an exemplary embodiment, the communication component 816 further comprises a near field communication (NEC) module to facilitate short-range communications. For example, the NEC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the methods illustrated in FIG. 1B, FIG. 2, FIG. 3, FIG. 4, FIG. 5, or FIG. 6A.

In exemplary embodiments, a non-transitory computer-readable storage medium including instructions is further provided, such as the memory 804 including instructions, executable by the processor 820 in the apparatus 800, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium, when instructions in the non-transitory computer-readable storage medium is executed by a processor of a mobile terminal, the mobile terminal is caused to execute the data transmission method illustrated in FIG. 1B, FIG. 2, FIG. 3, FIG. 4, FIG. 5, or FIG. 6A.

A computer program product including an instruction is provided. When run on a computer, the computer program product causes the computer to execute the data transmission method illustrated in FIG. 1B, FIG. 2, FIG. 3, FIG. 4, FIG. 5, or FIG. 6A.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. A data transmission method, comprising:
   receiving, by a terminal, a scheduling signaling sent by a base station, wherein the scheduling signaling carries scheduling type indication information;
   determining, by the terminal, a scheduling type corresponding to the scheduling type indication information based on the scheduling type indication information and pre-stored configuration information, wherein the configuration information comprises a correspondence between a plurality of pieces of scheduling type indication information and a plurality of scheduling types comprising a slot-based scheduling type and a symbol-based scheduling type; and
   performing, by the terminal, resource scheduling based on the scheduling type to achieve data transmission,
   wherein the scheduling type indication information is one of:
   a length of the scheduling signaling,
   a radio network temporary identifier (RNTI) in the scheduling signaling,
   a scrambling sequence,
   code indication information in a specified information field in the scheduling signaling with a length corresponding to a specified length, and
   location information in a control resource set where the scheduling signaling is located,
   wherein when the scheduling type indication information is the length of the scheduling signaling, the configuration information comprises a correspondence between a plurality of lengths and a plurality of scheduling types.

2. The method according to claim 1, wherein when the scheduling type indication information is the RNTI in the scheduling signaling, the configuration information comprises a correspondence between a plurality of groups of RNTIs and a plurality of scheduling types, and various RNTIs in each group are configured to perform scrambling processing on the scheduling signalings of a corresponding scheduling type, the scheduling signalings having different scheduling functions.

3. The method according to claim 1, wherein when the scheduling type indication information is the scrambling sequence, the configuration information comprises a correspondence between a plurality of scrambling sequences and a plurality of scheduling types, and each scrambling sequence is configured to perform scrambling processing on the scheduling signaling of a corresponding scheduling type, the scheduling signaling being obtained after scrambling processing is performed based on a same group of RNTIs.

4. The method according to claim 1, wherein when the scheduling type indication information is the code indication information in the specified information field in the scheduling signaling with the length corresponding to the specified length, the configuration information comprises a correspondence between a plurality of pieces of code indication information and a plurality of scheduling types.

5. The method according to claim 1, wherein when the scheduling type indication information is the location information in the control resource set where the scheduling signaling is located, the configuration information comprises a correspondence between a plurality of pieces of location information and a plurality of scheduling types, and the location information comprises time-domain location information, frequency-domain location information and beam location information.

6. The method according to claim 1, wherein before determining the scheduling type corresponding to the scheduling type indication information based on the scheduling type indication information and the pre-stored configuration information, the method further comprises:
   receiving and storing the configuration information sent by the base station.

7. The method according to claim 6, wherein the configuration information is sent by the base station through at least one of a radio resource control (RRC) signaling, a media access control (MAC) control element (CE) or a physical layer signaling.

8. A data transmission device, comprising:
   a processor; and
   a memory storing instructions executable by the processor,
   wherein the processor is configured to:
   receive a scheduling signaling sent by a base station, wherein the scheduling signaling carries scheduling type indication information;
   determine a scheduling type corresponding to the scheduling type indication information based on the scheduling type indication information and pre-stored configuration information, wherein the configuration information comprises a correspondence between a plurality of pieces of scheduling type indication information and a plurality of scheduling types comprising a slot-based scheduling type and a symbol-based scheduling type; and
   perform resource scheduling based on the scheduling type to achieve data transmission,
   wherein the scheduling type indication information is one of:
   a length of the scheduling signaling,
   a radio network temporary identifier (RNTI) in the scheduling signaling, a scrambling sequence, code indication information in a specified information field in the scheduling signaling with a length corresponding to a specified length, and location information in a control resource set where the scheduling signaling is located, wherein when the scheduling type indication information is the length of the scheduling signaling, the configuration information comprises a correspondence between a plurality of lengths and a plurality of scheduling types.

9. The device according to claim 8, wherein when the scheduling type indication information is the RNTI in the scheduling signaling, the configuration information comprises a correspondence between a plurality of groups of RNTIs and a plurality of scheduling types, wherein various RNTIs in each group is configured to perform scrambling processing on the scheduling signalings of a corresponding scheduling type, the scheduling signalings having different scheduling functions.

10. The device according to claim 8, wherein when the scheduling type indication information is the scrambling sequence, the configuration information comprises a correspondence between a plurality of scrambling sequences and a plurality of scheduling types, and each scrambling sequence is configured to perform scrambling processing on the scheduling signaling of a corresponding scheduling type, the scheduling signaling being obtained after scrambling processing is performed based on a same group of RNTIs.

11. The device according to claim 8, wherein when the scheduling type indication information is the code indication information in the specified information field in the scheduling signaling with the length corresponding to the specified length, and the configuration information comprises a correspondence between a plurality of pieces of code indication information and a plurality of scheduling types.

12. The device according to claim 8, wherein when the scheduling type indication information is the location information in the control resource set where the scheduling signaling is located, the configuration information comprises a correspondence between a plurality of pieces of location information and a plurality of scheduling types, and the location information comprises time-domain location information, frequency-domain location information and beam location information.

13. The device according to claim 8, wherein the processor is further configured to:

receive and store the configuration information sent by the base station.

14. The device according to claim 13, wherein the configuration information is sent by the base station through at least one of a radio resource control (RRC) signaling, a media access control (MAC) control element (CE) or a physical layer signaling.

15. A non-transitory computer-readable storage medium having stored thereon an instruction that, when executed by a processor of a device, causes the device to perform a data transmission method, the method comprising:

receiving a scheduling signaling sent by a base station, wherein the scheduling signaling carries scheduling type indication information;

determining a scheduling type corresponding to the scheduling type indication information based on the scheduling type indication information and pre-stored configuration information, wherein the configuration information comprises a correspondence between a plurality of pieces of scheduling type indication information and a plurality of scheduling types comprising a slot-based scheduling type and a symbol-based scheduling type; and performing resource scheduling based on the scheduling type to achieve data transmission, wherein the scheduling type indication information is one of:

a length of the scheduling signaling, a radio network temporary identifier (RNTI) in the scheduling signaling, a scrambling sequence, code indication information in a specified information field in the scheduling signaling with a length corresponding to a specified length, and location information in a control resource set where the scheduling signaling is located, wherein when the scheduling type indication information is the length of the scheduling signaling, the configuration information comprises a correspondence between a plurality of lengths and a plurality of scheduling types.

* * * * *